United States Patent [19]

Hubbard et al.

[11] 4,428,435
[45] Jan. 31, 1984

[54] AGRICULTURAL IMPLEMENT WITH HITCH CONTROL

[75] Inventors: Kevin L. Hubbard, Orion; Robert R. Roth, Rock Island, both of Ill.

[73] Assignee: Deere & Company, Moline, Ill.

[21] Appl. No.: 376,358

[22] Filed: May 10, 1982

[51] Int. Cl.³ ............................................... A01B 63/22
[52] U.S. Cl. .................................... 172/328; 172/413; 280/414.5
[58] Field of Search ............... 172/326, 327, 328, 413; 280/414.5, 43.23, 474

[56] References Cited

U.S. PATENT DOCUMENTS

| | | | |
|---|---|---|---|
| 2,684,021 | 7/1954 | Ratzlaff | 172/328 |
| 2,767,538 | 7/1954 | Scheidenhelm | 172/328 |
| 3,759,332 | 9/1973 | Robertson | 172/328 |
| 3,777,823 | 12/1973 | Holfeld | 172/328 |
| 3,912,017 | 10/1975 | Rehn | 172/328 |
| 4,326,594 | 4/1982 | Oka | 172/328 |

*Primary Examiner*—Richard J. Johnson
*Attorney, Agent, or Firm*—Henderson & Sturm

[57] ABSTRACT

A tractor-drawn agricultural implement of the type that requires a floating hitch member while operating but a rigid hitch member while in transport. This is achieved according to the present invention by linkage connected between a hitch member control mechanism and the cranked axle that serves as the wheeled carrying structure for the implement main frame. The linkage is arranged so that when the main frame is in its lowered or operating mode, a stop is clear from the hitch member control so that the hitch member has a free pivotal movement about a transverse axis, but when the frame is raised to transport or raised mode, the stop engages the hitch member control and renders the hitch member rigid with the frame.

1 Claim, 3 Drawing Figures

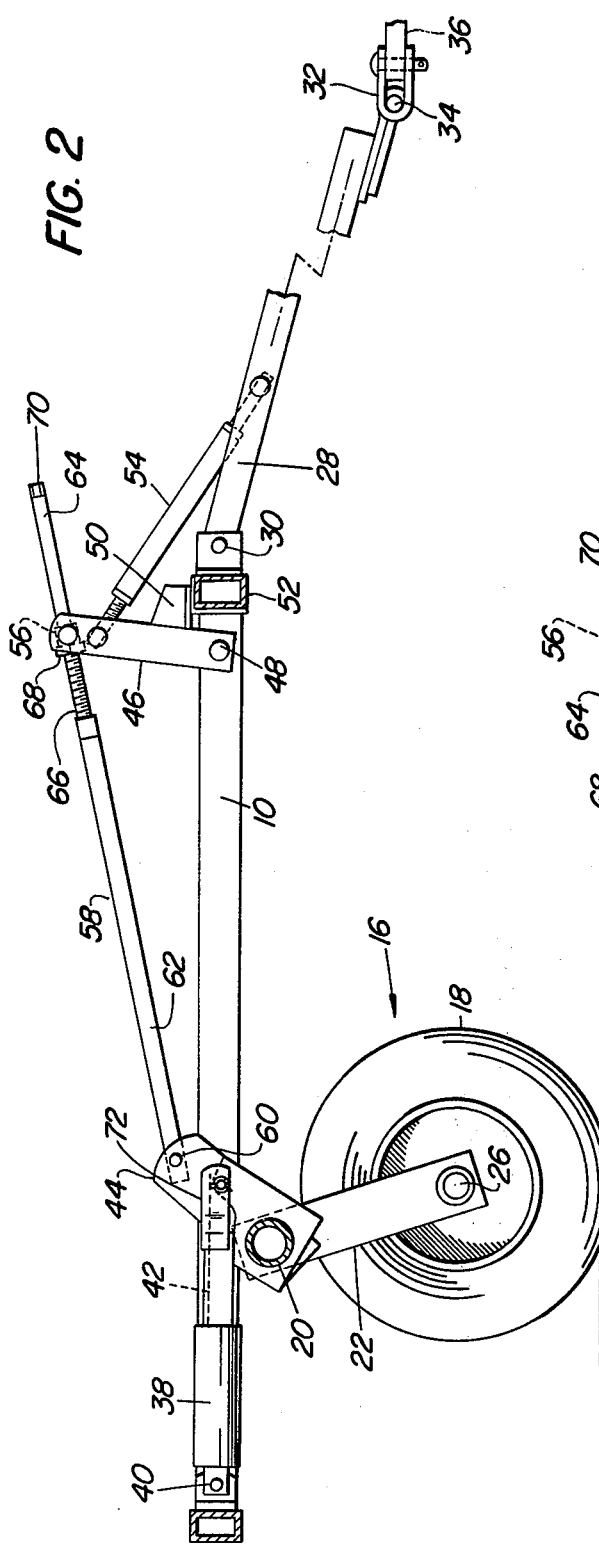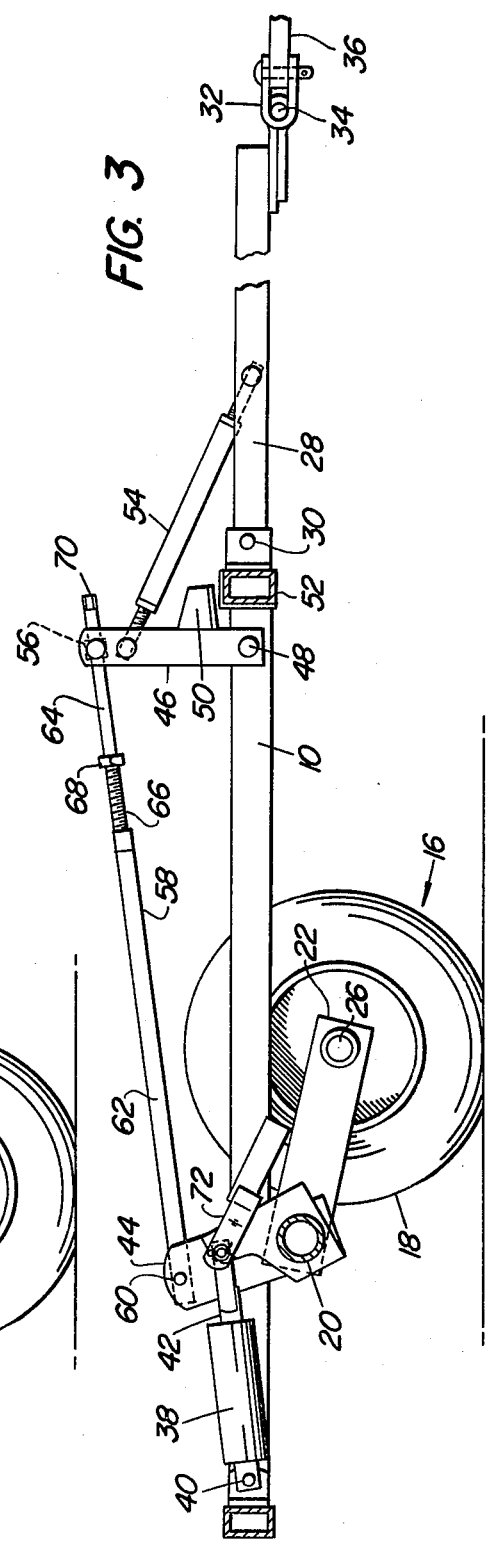

ial implement such as that referred to in the "Abstract" hereof.
AGRICULTURAL IMPLEMENT WITH HITCH CONTROL

BACKGROUND OF THE INVENTION

A roller harrow is typical of an agricultural implement such as that referred to in the "Abstract" hereof. The purpose of the pivotable or floating hitch member in operating or lowered mode is to enable the implement to follow the ground contour. It is desirable to lock out this pivotal movement in the transport mode of the implement so as to afford better control of the trailing implement over roads and highways and to eliminate teetering of the frame. The usual implement of this type is carried on wheel structure including a cranked axle or other frame-to-axle structure capable of being operated, as by hydraulic power, to selectively raise or lower the frame between its two modes or positions. The present invention provides linkage between the cranked axle or equivalent means and the hitch member for achieving the desired hitch member status in each mode; that is, a pivotable hitch member during ground working and a rigid hitch member during transport.

The invention features simple and positive linkage that may be easily incorporated into existing implements. Also a linkage that involves simple and efficient means for adjusting the hitch member as to height. The linkage employs a hitch member control member pivotable on the frame adjacent to the hitch member, plus a connection between this member and the drawbar. A link connected between the cranked axle or raising and lowering means is operative to determine the status of the hitch-connected member by means of a stop or abutment which frees the member and hitch member when the implement is in working position but which abuts the member and thus holds the hitch member fixed when the implement is raised. These and further features and significant advantages will appear to those versed in the art as a preferred embodiment of the invention is disclosed in the ensuing description taken in conjunction with the accompanying drawings.

DESCRIPTION OF THE DRAWINGS

FIG. 2 is a side view, with implement structure omitted, showing the implement in its raised or transport mode or position.

FIG. 3 is a similar view but shows the implement lowered or in ground-working position.

DESCRIPTION OF THE PREFERRED EMBODIMENT

Figure 1:
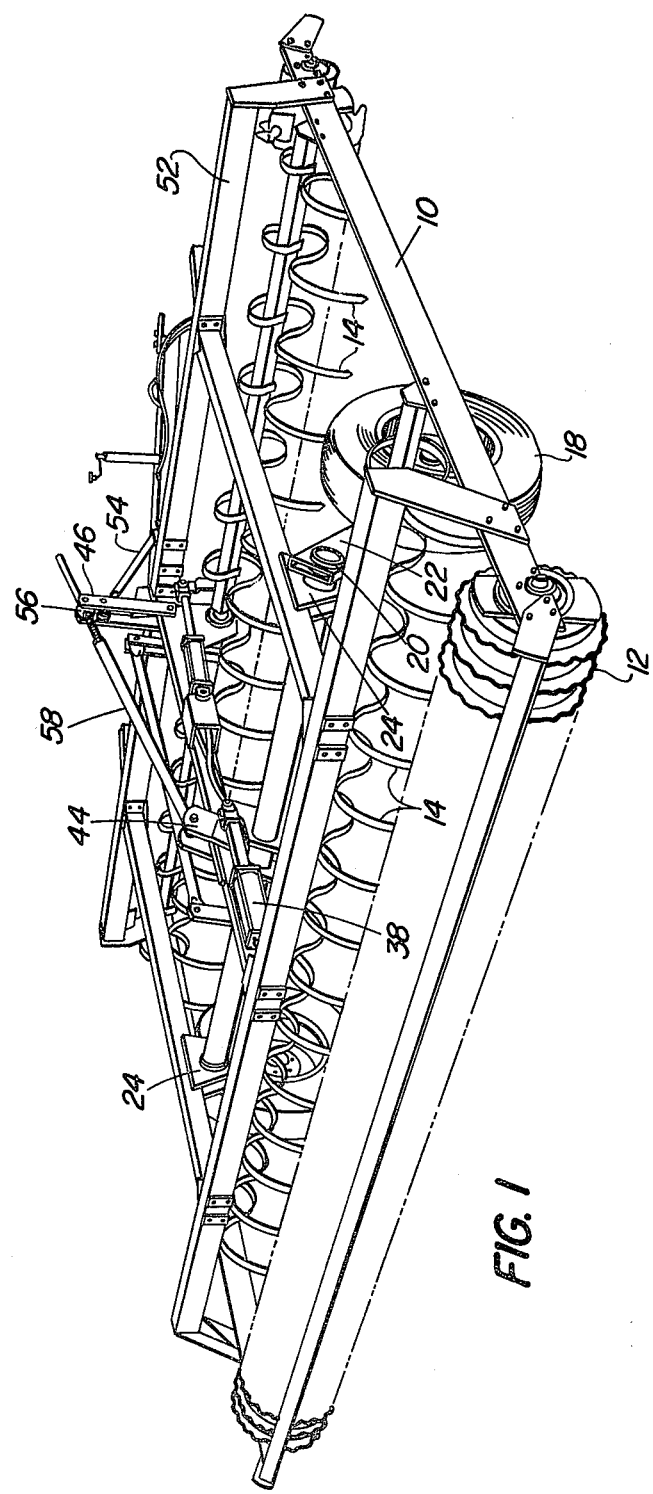
FIG. 1 is a perspective of a representative implement of the type under discussion here.

The implement chosen for purposes of illustration and description is a roller harrow having a generally rectangular main frame 10 equipped with ground-working roller means 12 as well as spring teeth 14. The direction of travel of the implement is to the viewer's right at seen in the drawings. The frame is typically carried on ground-engaging wheel and axle means 16, here shown as comprising a pair of relatively widely spaced apart wheels 18 and a cranked axle structure made up of a cross pipe 20 and depending arms 22. The cross pipe is rockable on the frame by means of suitable bearing supports 24, and the arms 22, welded to the pipe, respectively carry stub axles for journalling the wheels, all basically conventional design.

The fore part of the frame has connected thereto a longitudinal hitch member 28 having a pivotal connection at 30 to the frame on a transverse axis; i.e., an axis crosswise to the line of travel of the implement. The front end of the hitch member 28 may be connected to the tractor drawbar in any conventional manner that provides a transverse pivot about which the hitch member may have vertical movement relative to the tractor and such means, depicted here by way of illustration, has a clevis 32, including a second or front transverse pivot 34, for connection to a draft vehicle such as a tractor, which is here represented by a tractor drawbar 36. During the operation, or when the frame 10 is lowered, the frame is carried by the roller means 12 and the hitch member, the latter being free to pivot at both pivots 30 and 34. The frame is raised and lowered as by hydraulic power means including a hydraulic cylinder 38 anchored to the frame at 40 and having a piston 42 connected to an upstanding arm 44 welded or otherwise fixed to the axle cross pipe 20. When the cylinder is expanded, the piston extends to raise the frame as the wheels react against the ground. When the piston retracts, the frame lowers, all as typical of raising and lowering means of this nature.

A hitch member control member or arm 46 is pivoted to the frame 10 at 48 on a transverse axis closely to the rear of the hitch member axis. This control member has stop means 50 rigid thereon, and this stop is engageable with a portion 52 of the frame 10 upon forward or clockwise swinging of the member 46 to a predetermined extent (here shown engaged in FIG. 2). A connection 54 is effected between the arm 46 and a fore part of the hitch member 28. This connection is lengthwise adjustable as by incorporating a turnbuckle or its equivalent so that the height of the hitch member may be varied.

The upper part of the arm 46 carries a slide block 56 through which slides the fore part of a fore-and-aft compression link or rod 58, the rear end of which is pivotally connected to the cranked axle arm 44 at 60. This link is made up of two parts, a rear part 62 and a front part 64, the latter being threaded into the former as at 66 and including a fixed stop or abutment 68. That portion of the rod part 64 that projects ahead of the arm 46 is squared or otherwise formed at 70 for the purpose of receiving a tool by means of which the position of the stop 68 lengthwise of the rod and thus relative to the cooperative stop afforded by the slide block 56 may be changed to suit conditions.

A cylinder lockout 72 is provided for swinging between a free position (FIG. 3) to a locked position (FIG. 2), in the latter of which inadvertent retraction of the piston rod cannot occur.

When the frame has been raised to transport, the stop or abutment 68 on the rod firmly abuts the slide block 56 on the hitch member control arm 46 as the compression link or rod is moved forwardly as a result of raising the frame via the cylinder and piston. This causes the stop 50 to engage or abut the frame portion 52 and acts through the turnbuckle 54 to act downwardly on the hitch member 28, thus rigidifying same and cancelling the pivot axis 30, leaving, however, the front pivot 34 effective. In raised or transport position, the cylinder-piston lockout will be moved to locked position. As the drawn implement enters the field, the lockout is moved to free position (FIG. 3) and the piston rod retracted. This lowers the frame, and the link or rod 58 moves rearwardly to separate the stop 68 from the slide block 56 on the arm 46, with the result that the hitch member 28 is free again to pivot about the axis 30 to the extent permitted by the several connections; i.e., the stop at 50-52 prevents undesirable forward movement of the arm 46 and the rearward movement thereof can occur within the limits permitted by rearward sliding of the slide block 56 on the link or rod 58.

It will be seen from the foregoing that a simple control means has been provided by taking advantage of existing raising and lowering means, such as the wheeled axle structure. Features and advantages other than those specifically pointed out will become apparent to those versed in the art, all of which may be achieved without departure from the spirit and scope of the invention.

What is claimed is:

1. A ground-working implement having a fore-and-aft frame including front and rear ends, wheel means disposed below the frame rearwardly of the front end, cranked axle means journaling the wheel means and including an arm rockable on the frame, power means connected between the frame and cranked axle means arm for raising and lowering the frame between raised and lowered modes, a hitch member connected to the front end of the frame on a transverse axis and extending forwardly for connection to and support on a draft vehicle for vertical movement relative to the vehicle, and linkage means operatively connected between the hitch member and the cranked axle means for controlling relative movement between the frame and hitch member about the aforesaid axis, characterized in that the linkage includes a lever arm having upper and lower terminal ends and pivoted on a transverse axis at its lower terminal end to the front end of the frame, stop means cooperative between the frame and lever to limit forward movement of the lever in the raised mode of the frame, a compression link connected between the upper end of the lever arm and the arm of the cranked axle means and a second compression link connected between the hitch member and a portion of the lever arm above its pivot to the frame, the connection of the first link to the arm of the cranked axle means being so constructed as to enable only relative pivoting between said link and arm about a transverse axis, the connection of the first link to the lever arm including a one-way lost-motion device having an abutment effective to engage the lever arm only during the raised mode of the frame so as to lock out relative movement between the frame and cranked axle means and also between the frame and hitch member about the aforesaid transverse axes.

* * * * *